(12) United States Patent
Kong et al.

(10) Patent No.: US 12,510,906 B2
(45) Date of Patent: Dec. 30, 2025

(54) ROBOT DEVICE FOR IDENTIFYING MOVEMENT PATH BASED ON PRIVACY ZONE AND CONTROL METHOD THEREOF

(71) Applicant: SAMSUNG ELECTRONICS CO., LTD., Suwon-si (KR)

(72) Inventors: Jinah Kong, Suwon-si (KR); Seungjoon Lee, Suwon-si (KR); Yeeun Choi, Suwon-si (KR); Hoon Han, Suwon-si (KR); Jiwoong Hwang, Suwon-si (KR); Hyoin Ahn, Suwon-si (KR); Yeojun Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 158 days.

(21) Appl. No.: 18/375,078

(22) Filed: Sep. 29, 2023

(65) Prior Publication Data

US 2025/0028329 A1    Jan. 23, 2025

Related U.S. Application Data

(63) Continuation of application No. PCT/KR2023/012484, filed on Aug. 23, 2023.

(30) Foreign Application Priority Data

Aug. 24, 2022    (KR) .......................... 10-2022-0106235

(51) Int. Cl.
*G05D 1/246*    (2024.01)
*G05D 105/10*    (2024.01)
(Continued)

(52) U.S. Cl.
CPC ........... *G05D 1/246* (2024.01); *H04N 23/695* (2023.01); *G05B 2219/40202* (2013.01);
(Continued)

(58) Field of Classification Search
CPC .............. G05D 1/246; G05D 2107/40; G05D 2111/10; G05D 2105/10; G05D 2109/10;
(Continued)

(56) References Cited

U.S. PATENT DOCUMENTS

| | | |
|---|---|---|
| 9,740,207 B2 | 8/2017 | Storfer et al. |
| 10,551,839 B2 | 2/2020 | Jeong et al. |

(Continued)

FOREIGN PATENT DOCUMENTS

| | | |
|---|---|---|
| JP | 2019-508665 A | 3/2019 |
| KR | 10-2017-0004343 A | 1/2017 |

(Continued)

OTHER PUBLICATIONS

International Search Report dated Dec. 8, 2023, issued by the International Searching Authority in International Application No. PCT/KR2023/012484 (PCT/ISA/210).

(Continued)

*Primary Examiner* — Michael J Zanelli
(74) *Attorney, Agent, or Firm* — Sughrue Mion, PLLC

(57) ABSTRACT

A robot device includes: a sensor; a memory storing map information corresponding to a predetermined space and including a plurality of zones; and a processor that identifies a position of user, identifies whether the user is positioned in a first zone among the plurality of zones, based on the identified position of the user and the map information, and based on identifying that the user is positioned in the first zone, identifies a movement path of the robot device based on remaining zones except for the first zone among the plurality of zones.

20 Claims, 18 Drawing Sheets

(51) Int. Cl.
  *G05D 107/40* (2024.01)
  *G05D 111/10* (2024.01)
  *H04N 23/695* (2023.01)

(52) U.S. Cl.
  CPC ..... *G05D 2105/10* (2024.01); *G05D 2107/40* (2024.01); *G05D 2111/10* (2024.01)

(58) Field of Classification Search
  CPC ...... G05D 1/243; G05D 1/645; H04N 23/695; G05B 2219/40202; G05B 2219/40411; B25J 9/1664; B25J 13/00; B25J 13/08; B25J 19/02; B25J 13/006; B25J 19/023
  See application file for complete search history.

(56) References Cited

U.S. PATENT DOCUMENTS

| | | |
|---|---|---|
| 11,577,380 B2 | 2/2023 | Duthaler et al. |
| 11,899,467 B2 | 2/2024 | Kim et al. |
| 2007/0192910 A1* | 8/2007 | Vu .......................... H04N 7/142 901/1 |
| 2010/0030379 A1 | 2/2010 | Parlantzas et al. |
| 2016/0188977 A1 | 6/2016 | Kearns et al. |
| 2017/0000307 A1 | 1/2017 | Choi et al. |
| 2018/0136661 A1 | 5/2018 | Jeong et al. |
| 2018/0278835 A1 | 9/2018 | Meganathan |
| 2019/0021568 A1 | 1/2019 | Kim |
| 2019/0387203 A1 | 12/2019 | Sue |
| 2020/0257821 A1* | 8/2020 | Lai ....................... H04N 23/695 |
| 2020/0285248 A1 | 9/2020 | Kim et al. |
| 2021/0342479 A1 | 11/2021 | Schluntz et al. |
| 2022/0219311 A1* | 7/2022 | Duthaler ................ G05D 1/645 |
| 2024/0045440 A1 | 2/2024 | Kim et al. |

FOREIGN PATENT DOCUMENTS

| | | |
|---|---|---|
| KR | 10-2019-0002152 A | 1/2019 |
| KR | 10-2019-0114930 A | 10/2019 |
| KR | 10-2048992 B1 | 11/2019 |
| KR | 10-2020-0115696 A | 10/2020 |
| KR | 10-2458428 B1 | 10/2022 |
| KR | 10-2576345 B1 | 9/2023 |
| WO | 2020/230929 A1 | 11/2020 |

OTHER PUBLICATIONS

Written Opinion dated Dec. 8, 2023, issued by the International Searching Authority in International Application No. PCT/KR2023/012484 (PCT/ISA/237).

* cited by examiner

ROBOT DEVICE FOR IDENTIFYING MOVEMENT PATH BASED ON PRIVACY ZONE AND CONTROL METHOD THEREOF

CROSS-REFERENCE TO RELATED APPLICATION(S)

This application is a bypass continuation of International Application No. PCT/KR2023/012484, filed on Aug. 23, 2023, which is based on and claims priority to Korean Patent Application No. 10-2022-0106235, filed on Aug. 24, 2022, in the Korean Intellectual Property Office, the disclosures of which are incorporated by reference herein in their entireties.

BACKGROUND

1. Field

The disclosure relates to a robot device and a control method thereof, and more particularly, to a robot device for identifying a movement path based on a privacy zone, and a control method thereof.

2. Description of Related Art

Various types of robot devices traveling in a space and performing specific actions have become popular, such as a serving robot replacing a person in a store, a cafe, or a restaurant, or a robot cleaner automatically cleaning a zone by suctioning a foreign material while traveling on its own without intervention by a user.

The robot device may detect its surrounding environment by using a sensor, and may identify a movement path based thereon. However, the robot device may be positioned in a privacy zone of a house. Accordingly, data on the surrounding environment that is detected by the robot device may require high security, and a privacy violation may occur in case that the data is leaked to the outside.

Therefore, there is an emerging need for restricting movement of the robot device in the privacy zone rather than the other spaces among a plurality of spaces in the house.

There is a demand for a method for restricting the movement of the robot device under a certain condition in the privacy zone or space having a high risk of the privacy violation, while the robot device is moved throughout the plurality of spaces in the house to perform a function.

SUMMARY

According to an aspect of the disclosure, a robot device includes: a sensor; a memory configured to store map information corresponding to a predetermined space, the map information including a plurality of zones; and at least one processor configured to: identify a position of a user; identify whether the user is positioned in a first zone among the plurality of zones, based on the identified position of the user and the map information, and based on identifying that the user is positioned in the first zone, identify a movement path of the robot device based on remaining zones, except for the first zone, among the plurality of zones, based on identifying that the user is positioned in the first zone, identify a second zone adjacent to the first zone from among the plurality of zones, based on the map information, and based on the robot device being positioned in the second zone while the robot device is moved along the identified movement path, control an operation of the sensor.

The map information may include information about the first zone indicating a restricted movement zone of the robot device, and information about the second zone indicating a restricted detection zone of the sensor, and wherein the at least one processor may be further configured to: based on identifying that the user is positioned in the first zone, identify the movement path to not include the first zone, and deactivate the sensor based on the information about the second zone while the robot device is moved in the second zone along the movement path.

The robot device may further include a communication interface including a circuit; and a display, wherein the at least one processor may be further configured to: based on the sensor being deactivated, control the display to provide visual feedback indicating the sensor is deactivated, and transmit a control signal to a user terminal device to provide the visual feedback to the user terminal device through the communication interface.

The sensor may include a camera, and wherein the at least one processor may be further configured to: adjust a detection direction of the camera for a detection zone of the camera to not include an object that distinguishes the first zone from the remaining zones while the robot device is moved in the second zone along the movement path, and the object is a door frame.

The robot device may further include a communication interface including a circuit, wherein the at least one processor may be further configured to: receive information about a position of a user terminal device by communicating with the user terminal device through the communication interface, and identify the information about the position of the user terminal device as the position of the user.

The robot device may further include a communication interface including a circuit, wherein the at least one processor may be further configured to, based on receiving state information from an external device positioned in the first zone, identify the position of the user based on the state information of the external device.

The at least one processor may be further configured to, based on identifying a predetermined event, re-identify the movement path based on the plurality of zones.

The predetermined event may be an event in which the position of the user is changed from the first zone to a third zone among the plurality of zones, and the third zone may be the remaining zones among the plurality of zones except for the first zone.

The robot device may further include a communication interface including a circuit, wherein the predetermined event may be an event of receiving a user call signal through the communication interface, and wherein the at least one processor may be further configured to, based on identifying the user call signal, re-identify the movement path for the robot device to be moved to a zone where the user is positioned among the plurality of zones based on the position of the user and the map information.

The robot device may further include a communication interface including a circuit, wherein the at least one processor may be further configured to: based on identifying that the user is positioned in the first zone, identify an external device positioned in the first zone, acquire a control signal corresponding to the identified external device, and transmit the acquired control signal to the external device through the communication interface.

According to an aspect of the disclosure, a control method of a robot device includes: identifying a position of a user; identifying whether the user is positioned in a first zone among the plurality of zones based on the identified position of the user and the map information; based on identifying that the user is positioned in the first zone, identifying a movement path of the robot device based on remaining zones, except for the first zone, among the plurality of zones; based on identifying that the user is positioned in the first zone, identifying a second zone adjacent to the first zone from among the plurality of zones, based on the map information; and based on the robot device being positioned in the second zone while the robot device is moved along the identified movement path, controlling an operation of a sensor.

The map information may include information about the first zone indicating a restricted movement zone of the robot device, and information about the second zone indicating a restricted detection zone of the sensor, wherein the identifying of the movement path includes, based on identifying that the user is positioned in the first zone, identifying the movement path to not include the first zone, and wherein the controlling of the operation of the sensor includes deactivating the sensor based on the information about the second zone while the robot device is moved in the second zone along the movement path.

The method may further include, based on the sensor being deactivated, providing visual feedback indicating the deactivation of the sensor; and transmitting a control signal to a user terminal device to provide the visual feedback to the user terminal device.

The controlling of the operation of the sensor may include adjusting a detection direction of a camera for a detection zone of the camera to not include an object that distinguishes the first zone from the remaining zones while the robot device is moved in the second zone along the movement path, and wherein the object is a door frame.

The identifying of whether the user is positioned in the first zone may include: receiving information about a position of a user terminal device by communicating with the user terminal device; and identifying the information about the position of the user terminal device as the position of the user.

According to an aspect of the disclosure, an electronic device includes: a memory configured to store instructions; at least one processor configured to execute the instructions to: identify a position of a user; identify whether the user is positioned in a first zone among a plurality of zones, based on the identified position of the user and map information, the map information including the plurality of zones, and based on identifying that the user is positioned in the first zone, identify a movement path of the electronic device based on remaining zones, except for the first zone, among the plurality of zones, based on identifying that the user is positioned in the first zone, identify a second zone adjacent to the first zone from among the plurality of zones, based on the map information, and based on the electronic device being positioned in the second zone while the electronic device is moved along the identified movement path, control an operation of the sensor.

The map information may include information about the first zone indicating a restricted movement zone of the electronic device, and information about the second zone indicating a restricted detection zone of the sensor, and wherein the at least one processor is further configured to: based on identifying that the user is positioned in the first zone, identify the movement path to not include the first zone, and deactivate the sensor based on the information about the second zone while the electronic device is moved in the second zone along the movement path.

The electronic device may further include a communication interface including a circuit; and a display, wherein the at least one processor may be further configured to: based on the sensor being deactivated, control the display to provide visual feedback indicating the sensor is deactivated, and transmit a control signal to a user terminal device to provide the visual feedback to the user terminal device through the communication interface.

The sensor may include a camera, and wherein the at least one processor may be further configured to: adjust a detection direction of the camera for a detection zone of the camera to not include an object that distinguishes the first zone from the remaining zones while the electronic device is moved in the second zone along the movement path.

The electronic device may further include a communication interface including a circuit, wherein the at least one processor may be further configured to: receive information about a position of a user terminal device by communicating with the user terminal device through the communication interface, and identify the information about the position of the user terminal device as the position of the user.

BRIEF DESCRIPTION OF THE DRAWINGS

The above and other aspects, features, and advantages of embodiments of the disclosure will be more apparent from the following description taken in conjunction with the accompanying drawings, in which.

DETAILED DESCRIPTION

Figure 1:
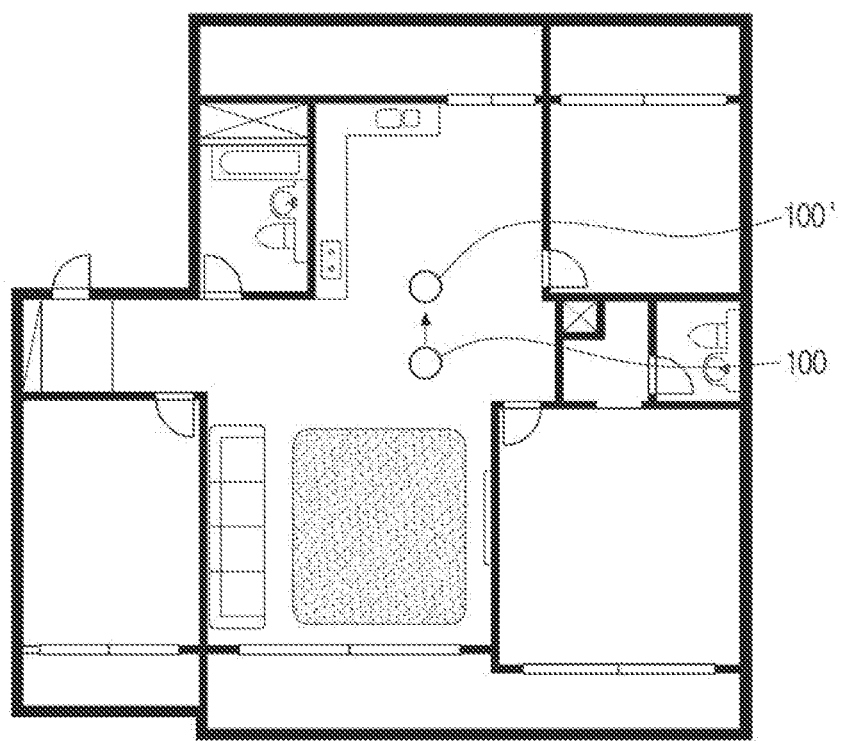
FIG. 1 is a block diagram showing an electronic apparatus, according to one or more embodiments of the disclosure.

Hereinafter, example embodiments of the disclosure will described in detail with reference to the accompanying drawings.

General terms that are currently widely used are selected as terms used in embodiments of the disclosure in consideration of functions in the disclosure, and may be changed based on the intention of those skilled in the art or a judicial precedent, the emergence of a new technique, and the like. In addition, in a specific case, terms arbitrarily chosen by an applicant may exist. In this case, the meanings of such terms are mentioned in detail in corresponding descriptions of the disclosure. Therefore, the terms used in referring to embodiments of the disclosure need to be defined on the basis of the meanings of the terms and the contents throughout the disclosure rather than simple names of the terms.

In the disclosure, an expression "have," "may have," "include," "may include" or the like, indicates the existence of a corresponding feature (for example, a numerical value, a function, an operation or a component such as a part), and does not exclude the existence of an additional feature.

The expression "at least one of A or B" indicates only A, only B," or both of A and B.

Expressions "first," "second," and the like, used in the disclosure may indicate various components regardless of a sequence or importance of the components. These expressions are used only to distinguish one component from another component, and do not limit the corresponding components.

In case that any component (for example, a first component) is mentioned to be "(operatively or communicatively) coupled with/to" or "connected to" another component (for example, a second component), it is to be understood that any component may be directly coupled to another component or may be coupled to another component through still another component (for example, a third component).

A term of a singular number may include its plural number unless explicitly indicated otherwise in the context. It is to be understood that a term "include," "formed of," or the like used in the present application specifies the presence of features, numerals, steps, operations, components, parts, or combinations thereof, mentioned in the specification, and does not preclude the presence or addition of one or more other features, numerals, steps, operations, components, parts, or combinations thereof.

In the embodiments, a "module" or a "~er/~or" may perform at least one function or operation, and be implemented by hardware or software or be implemented by a combination of hardware and software. In addition, a plurality of "modules" or a plurality of "~ers/~ors" may be integrated in at least one module and implemented by at least one processor except for a "module" or a "~er/or" that needs to be implemented by specific hardware.

In the disclosure, a term "user" may refer to a person who uses an electronic device or a device (e.g., artificial intelligence electronic device) which uses an electronic device.

Hereinafter, one or more embodiments of the disclosure are described in detail with reference to the accompanying drawings.

FIG. 1 is a view illustrating a robot device according to one or more embodiments of the disclosure.

As shown in FIG. 1, a robot device 100 may refer to various types of devices having ability to perform a function for itself. For example, the robot device 100 may be a smart device autonomously operated by detecting a surrounding environment of the robot device 100 in real time based on detection data of a sensor (e.g., light detection and ranging (LiDAR) sensor or camera) and collecting information in addition to performing a simple and repetitive function.

The robot device 100 according to one or more embodiments of the disclosure may include a driver including an actuator or a motor. The driver according to one or more embodiments may include a wheel, a brake, or the like, and the robot device 100 may be moved for itself in a specific space by using the wheel, the brake, or the like, included in the driver.

In addition, the robot device 100 may include a robot joint (or articulation). Here, the robot joint may be one component of the robot device 100 for substituting a function of a human arm or hand.

The robot device 100 according to one or more embodiments of the disclosure may include a sensor, and acquire a map of a space (e.g., predetermined space in a house) where the robot device 100 is positioned based on the detection data of the sensor.

In addition, the robot device 100 may identify the position of the robot device 100 on the map based on the detection data.

For example, the robot device 100 may identify a movement path based on the map, and identify the position of the robot device 100 on the map while the robot device 100 is moved in the space based on the movement path.

For example, the robot device 100 may acquire the map of the space where the robot device 100 is positioned, and identify the current location of the robot device 100 on the map by performing a simultaneous localization and mapping (or SLAM) operation.

The robot device 100 may be classified into a robot device for industrial, medical, household, military, or exploration use based on its field or its function which may be performed. According to one or more embodiments, the industrial robot device may be subdivided into a robot device used in a product-manufacturing process of a factory, a robot device serving a customer, receiving an order, and providing the serving, or the like in a store or a restaurant. For example, the robot device 100 may be implemented as a serving robot device which may transport a service item to a position desired by a user or to a specific position in any of various places such as a restaurant, a hotel, a mart, a hospital, a clothing store, and the like.

However, this implementation is only an example, and the robot device 100 may be classified into various types based on its application field, function, and purpose of use, and is not limited to the above-described example.

For example, as shown in FIG. 1, the robot device 100 may be implemented as a robot cleaner positioned in the house. Here, the robot cleaner may be a device driven by electric power and automatically suctioning a foreign material. Hereinafter, for convenience of explanation, it is assumed that the robot device 100 is the robot cleaner, and the robot cleaner is implemented as a flat-type in close contact with a floor to suction the foreign material on the floor. However, this implementation is only an example, and the robot device 100 may be implemented in various forms as described above.

Figure 2:
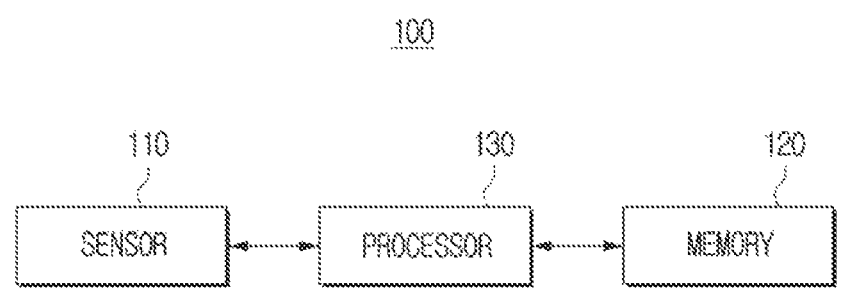
FIG. 2 is a block diagram showing a configuration of the robot device, according to one or more embodiments of the disclosure.

FIG. 2 is a block diagram showing a configuration of the robot device according to one or more embodiments of the disclosure.

The robot device 100 according to one or more embodiments may include a memory 120, a sensor 110, and at least one processor 130.

The sensor 110 may include the LiDAR sensor, the camera, or the like.

For example, the LiDAR sensor may emit a laser beam under control of the processor 130 to detect the surrounding environment.

For example, the LiDAR sensor may acquire, as the detection data, a distance to an object adjacent to the robot device 100, a direction in which the object is positioned, and a characteristic of the object (e.g., geometric characteristic of the object or photometric characteristic of the object). The processor 130 may acquire the space where the robot device 100 is positioned as two-dimensional (2D)/three-dimensional (3D) image information (e.g., map) based on the detection data.

For example, the camera may detect the surrounding environment of the robot device 100 by capturing the surrounding environment under the control of the processor 130.

For example, the camera may acquire image data including the adjacent object. The processor 130 may then analyze the image data to acquire, as the detection data, the distance to the object adjacent to the robot device 100, the direction in which the object is positioned, and the characteristic (e.g., geometric characteristic or photometric characteristic) of the object, and acquire the space where the robot device 100 is positioned as the 2D/3D image information (e.g., map) based on the detection data.

The object may include a dynamic object and a static object. For example, the dynamic object may include a person or a pet, and the static objects may include a wall, furniture, or a home appliance.

The sensor 110 is not limited to the above example, and may include various types of sensors which may detect the surrounding environment of the robot device 100 in addition to the LiDAR sensor or the camera.

The memory 120 according to one or more embodiments may store data required for various embodiments of the disclosure. The memory 120 may be implemented as a memory embedded in the robot device 100, or implemented as a memory detachable from the robot device 100, based on a data storage purpose. For example, data for driving the robot device 100 may be stored in the memory embedded in the robot device 100, and data for an extension function of the robot device 100 may be stored in the memory detachable from the robot device 100.

The memory embedded in the robot device 100 may be implemented as at least one of a volatile memory (for example, a dynamic random access memory (DRAM), a static RAM (SRAM), or a synchronous dynamic RAM (SDRAM)), a non-volatile memory (for example, an one time programmable read only memory (OTPROM), a programmable ROM (PROM), an erasable and programmable ROM (EPROM), an electrically erasable and programmable ROM (EEPROM), a mask ROM, or a flash ROM), a flash memory (for example, a NAND flash, or a NOR flash), a hard drive, or a solid state drive (SSD)). In addition, the memory detachable from the robot device 100 may be implemented in the form of a memory card (for example, a compact flash (CF), a secure digital (SD), a micro secure digital (Micro-SD), a mini secure digital (Mini-SD), an extreme digital (xD), or a multi-media card (MMC)), or an external memory (for example, a USB memory) which may be connected to a universal serial bus (USB) port.

For example, the memory 120 may store at least one instruction for controlling the robot device 100 or a computer program including the instructions.

According to one or more embodiments of the disclosure, various data may be stored in an external memory of the processor 130, some of the data may be stored in an internal memory of the processor 130, and the rest may be stored in the external memory.

In particular, the memory 120 may store the map of the predetermined space where the robot device 100 is positioned under the control of the processor 130.

The map may include a plurality of zones. For example, the processor 130 may classify the map into the plurality of zones based on a user command, or classify the map into the plurality of zones by identifying an independent zone surrounded by the walls based on the detection data.

In addition, the processor 130 may classify the map into the plurality of zones by identifying an object that classifies and/or distinguishes one zone from another zone based on the detection data. The object that classifies the one zone from another zone may include a door frame, a window, a fence, or a stair.

For example, at least one of the plurality of zones included in the map may be a first zone, and at least one of the remaining zones may be a second zone.

The first zone may indicate a restricted movement zone where the movement of the robot device 100 is restricted, and the second zone may indicate a restricted detection zone where the detection of the sensor 110 is restricted.

For example, the memory 120 may store map information including information on the first zone indicating the restricted movement zone of the robot device 100 among the plurality of zones, and information on the second zone indicating the restricted detection zone of the sensor 110. A detailed description thereof is provided with reference to FIG. 3.

At least one processor 130 according to one or more embodiments of the disclosure may control overall operations of the robot device 100.

According to one or more embodiments of the disclosure, the processor 130 may be implemented as a digital signal processor (DSP) processing a digital signal, a microprocessor, or a time controller (TCON). However, the processor 130 is not limited thereto, and may include one or more of a central processing unit (CPU), a micro controller unit (MCU), a micro processing unit (MPU), a controller, an application processor (AP), a communication processor (CP), or an advanced reduced instruction set computer (RISC) machines (ARM) processor or an artificial intelligence (AI) processor, or may be defined by this term. In addition, the processor 130 may be implemented in a system-on-chip (SoC) or a large scale integration (LSI) in which a processing algorithm is embedded, or may be implemented in the form of a field programmable gate array (FPGA). The processor 130 may perform various functions by executing computer executable instructions stored in the memory.

In particular, the processor 130 according to one or more embodiments may identify user position information.

For example, the processor 130 may identify the user position information based on the detection data of the sensor 110. In addition, the processor 130 may identify the user position information by communicating with an external device (e.g., terminal device) through a communication interface.

The processor 130 may identify whether the user is positioned in the first zone among the plurality of zones based on the user position information and the map information.

The processor 130 according to one or more embodiments may identify the movement path of the robot device 100 based on the remaining zones except for the first zone among the plurality of zones in case of identifying that the user is positioned in the first zone among the plurality of zones. That is, the processor 130 may restrict the movement of the robot device 100 to the first zone.

Figure 3:
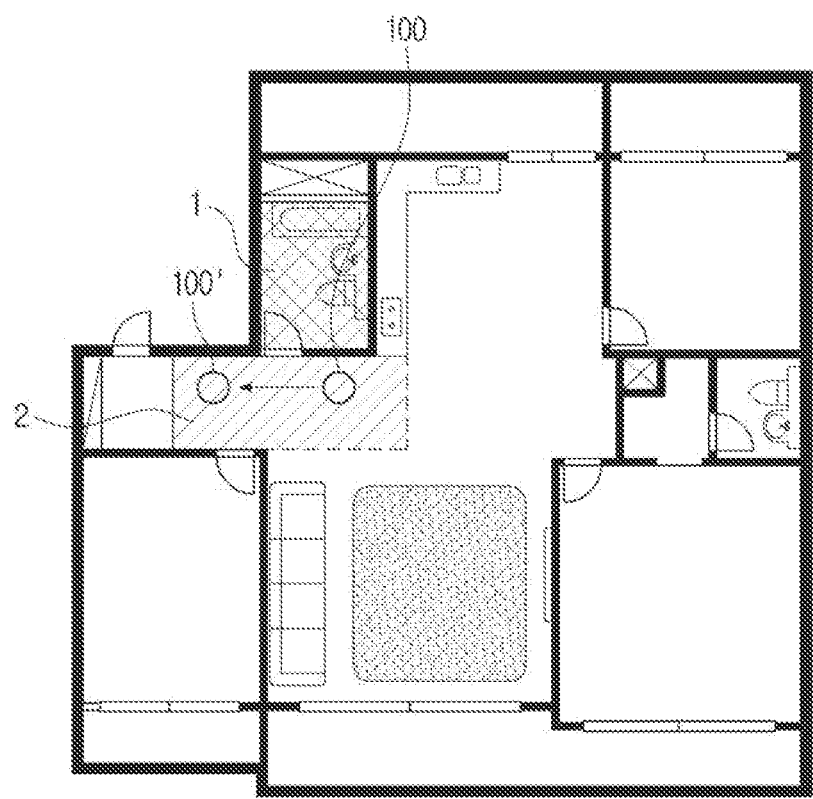
FIG. 3 is a view illustrating a first zone and a second zone, according to one or more embodiments of the disclosure.

FIG. 3 is a view illustrating the first zone and the second zone according to one or more embodiments of the disclosure.

Referring to FIG. 3, at least one zone among the plurality of zones may be classified as the first zone.

The movement of the robot device 100 to the first zone 1 may be restricted in case that the user is positioned in a first zone 1. Therefore, the first zone 1 may be referred to as a first zone, a privacy zone, a privacy area, a restricted movement zone, an entry prohibition zone, or the like, and hereinafter, for convenience of description, this zone is collectively referred to as the first zone 1.

According to one or more embodiments, the robot device 100 may include the sensor 110, and the sensor 110 may detect the surrounding environment. The surrounding environment (hereinafter, detection data) detected by the sensor 110 may correspond to a user privacy zone, thus requiring a high level of security.

According to one or more embodiments, the first zone 1 among the plurality of zones may be the user privacy zone (e.g., bathroom, bedroom, or dressing room). Therefore, in case that the user is positioned in the first zone 1, the processor 130 may identify the movement path for the robot device 100 not to be moved to the first zone 1. That is, in case that the user is positioned in the first zone 1, the processor 130 may identify the movement path based on the remaining zones except for the first zone 1 among the plurality of zones for the sensor 110 of the robot device 100 not to detect the first zone 1.

The processor 130 according to one or more embodiments may identify a second zone 2 adjacent to the first zone 1 among the plurality of zones based on the map information in case of identifying that the user is positioned in the first zone 1 among the plurality of zones.

The second zone 2 may indicate the restricted detection zone where the detection of the sensor 110 is restricted.

For example, the processor 130 may identify the movement path for the robot device 100 to be moved in the second zone 2, and may restrict the detection of the sensor 110 while the robot device 100 is moved in the second zone 2.

For example, the processor 130 may deactivate the sensor 110 while the robot device 100 is moved in the second zone 2.

For example, the processor 130 may adjust a detection direction of the sensor 110 for the sensor 110 not to detect a specific object while the robot device 100 is moved in the second zone 2. For example, the processor 130 may adjust the detection direction of the sensor 110 for a detection zone (e.g., field of view (FOV) or angle of view) of the camera included in the sensor 110 not to include the specific object.

The specific object may include an object that classifies and/or distinguishes the first zone 1 from the remaining zones. For example, the specific object may include the door frame, the window, the fence, or the stair, classifying first zone 1 from the remaining zones.

Referring to FIG. 3, the second zone 2 may be a zone adjacent to the first zone 1. For example, the processor 130 may identify, as the second zone 2, a zone within a N meter (m) in a radius direction from the object that classifies the first zone 1 from the remaining zones.

Figure 4:
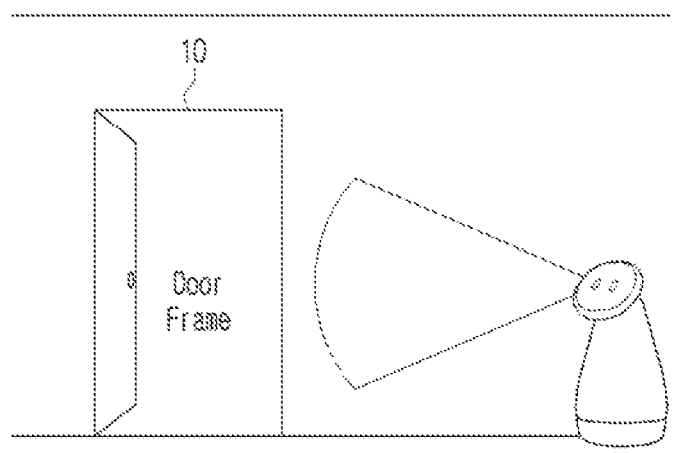
FIG. 4 is a view illustrating a door frame, according to one or more embodiments of the disclosure.
Figure 5:
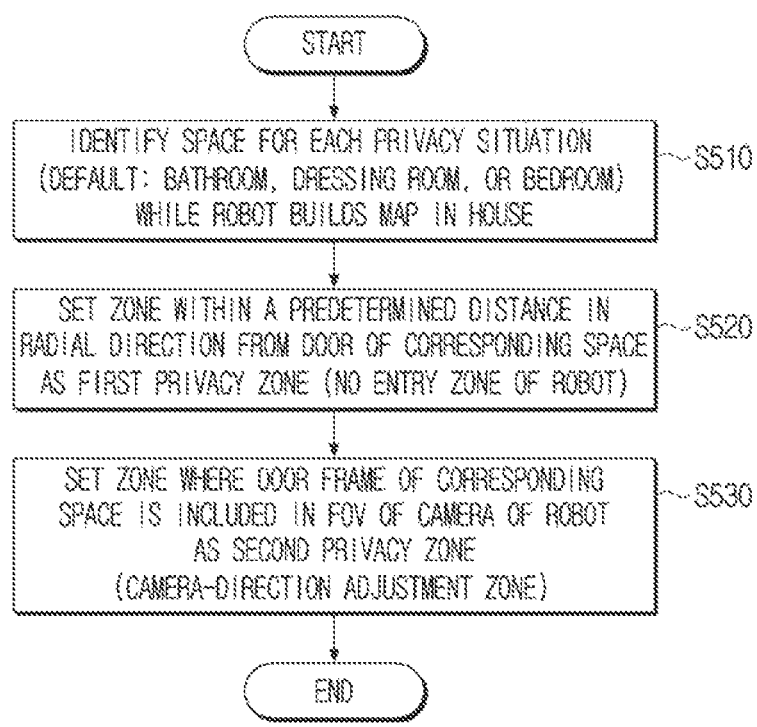
FIG. 5 is a flowchart illustrating a method of acquiring map information including information on a restricted movement zone and information on a restricted detection zone according to one or more embodiments of the disclosure.

The description describes a method of the processor 130 acquiring the map information including the information on the first zone indicating the restricted movement zone of the robot device 100 and the information on the second zone indicating the restricted detection zone of the sensor 110 according to one or more embodiments in detail with reference to FIGS. 4 and 5.

FIG. 4 is a view illustrating the door frame according to one or more embodiments of the disclosure.

Referring to FIG. 4, the processor 130 according to one or more embodiments may acquire the map of the space where the robot device 100 is positioned by performing the simultaneous localization and mapping (SLAM) operation, and classify the map into the plurality of zones by identifying the object that classifies and/or distinguishes one zone from another zone such as a door frame 10.

In addition, the processor 130 may identify use of the one zone by identifying an object positioned in one of the plurality of zones.

For example, the processor 130 may identify the object positioned in the one zone based on the detection data received from the sensor 110 while the robot device 100 is moved in the one zone, and identify the use of the one zone based on the identified object.

For example, the processor 130 may identify the one zone as a bedroom in case that the identified object is a bed, and the processor 130 may identify the one zone as a bathroom in case that the identified object is a washstand.

For example, the processor 130 may identify the one zone as a kitchen in case that the identified object is a refrigerator.

The processor 130 may identify at least one zone among the plurality of zones as the first zone 1 based on the use of each of the plurality of zones included in the map.

A detailed description thereof is provided with reference to FIG. 5.

FIG. 5 is a flowchart illustrating a method of acquiring map information including information on a restricted movement zone and information on a restricted detection zone according to one or more embodiments of the disclosure.

Referring to FIG. 5, the processor 130 may identify at least one of the plurality of zones as a privacy zone (e.g., first zone 1) (S510) based on the use of each of the plurality of zones included in the map while the robot device 100 builds the map in the house (hereinafter, while performing the SLAM operation).

For example, the processor 130 may identify one zone as the first zone 1 in case of identifying the use of the one zone as the bathroom, the bedroom, the dressing room, or the like.

The processor 130 may not identify the one zone as the first zone 1 because the kitchen or a living room may be a public zone rather than the privacy zone in case that the use of the one zone is the kitchen or the living room.

The processor 130 may identify the first zone 1 as the restricted movement zone of the robot device 100 and acquire information on the first zone 1 (S520).

The processor 130 may identify, as the second zone 2, the zone within a predetermined distance (e.g., N meters (m)) in the radius direction from the object (e.g. door frame 10) that classifies and/or distinguishes the first zone 1 from the remaining zones, and acquire information on the second zone 2 (S530).

The processor 130 may store, in the memory 120, the map information including the information on the first zone 1 acquired in the step S520 and the information on the second zone 2 acquired in the step S530.

The above example describes the method of the processor 130 identifying the use of each of the plurality of zones included in the map by using a rule-based algorithm, a neural network model algorithm, or the like, and then identifying at least one zone among the plurality of zones as the first zone 1 based on the use of each of the plurality of zones. However, the disclosure is not limited thereto.

For example, the processor 130 may acquire the map of the predetermined space where the robot device 100 is positioned by performing the SLAM operation, and set at least one of the plurality of zones as the first zone 1 based on the user command for the map, and set the second zone 2 adjacent to the first zone 1.

For example, the processor 130 may set a zone having a possibility of privacy violation in case that the detection data of the sensor 110 is leaked among the plurality of zones as the first zone 1 based on the user command. Here, situations where the privacy violation may occur include showering, sleeping, changing clothes, or the like, and the bathroom, the bedroom, the dressing room, or the like may thus be set as the first zone 1 based on the user command.

The description assumes one or more embodiments in which the processor 130 identifies, as the second zone 2, the zone within the N meter (m) in the radius direction from the object that classifies as the first zone 1 from the remaining zones in the step S530, which is only an example, and the processor 130 may set the second zone 2 based on the user command.

Figure 6:
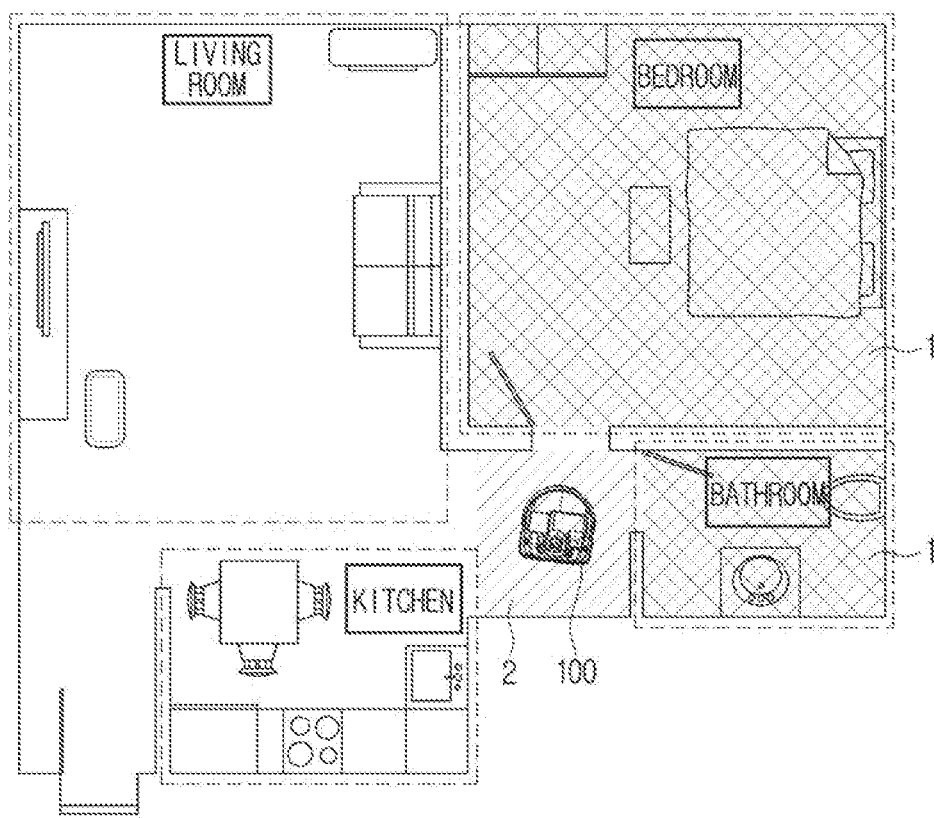
FIG. 6 is a view for explaining a movement path, according to one or more embodiments of the disclosure.

FIG. 6 is a view illustrating the movement path according to one or more embodiments of the disclosure.

For example, FIG. 6 illustrates an example of the map information.

Referring to FIG. 6, the map information may include the use of each of the plurality of zones, and may include the information on the first zone 1 indicating the restricted movement zone of the robot device 100 and the information on the second zone 2 indicating the restricted detection zone of the sensor 110 among the plurality of zones.

According to one or more embodiments, in case of identifying that the user is positioned in the first zone 1, the processor 130 may identify the movement path of the robot device 100 based on the remaining zones except for the first zone 1 among the plurality of zones.

In addition, in case of identifying that the user is positioned in the first zone 1, the processor 130 may identify the second zone 2 adjacent to the first zone 1 based on the map information.

The processor 130 may control the operation of the sensor 110 in case that the robot device 100 is positioned in the second zone 2 while the robot device 100 is moved along the movement path.

Figure 7:
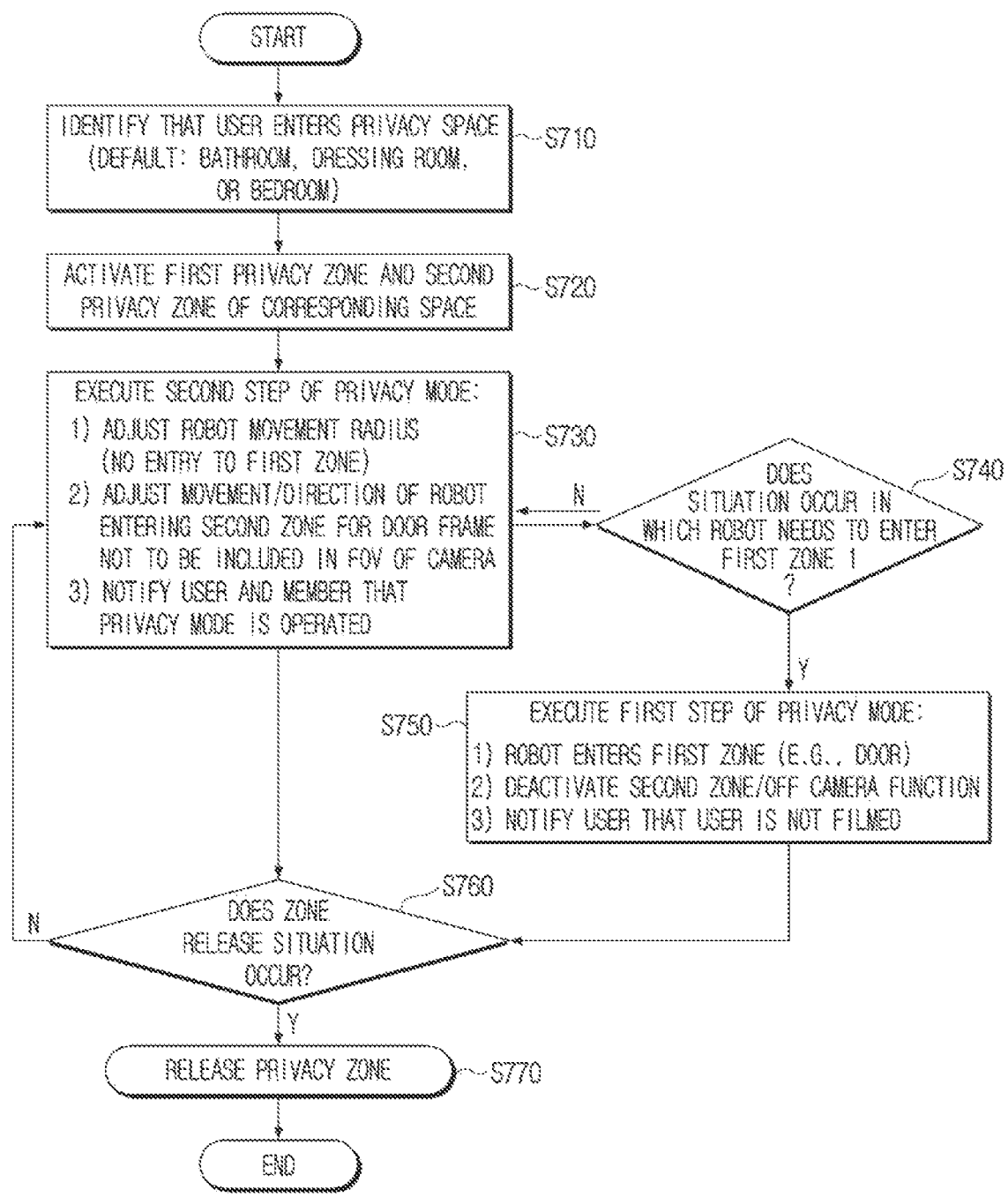
FIG. 7 is a view illustrating a control method of a robot device, according to one or more embodiments of the disclosure.

FIG. 7 is a view illustrating a control method of a robot device according to one or more embodiments of the disclosure.

In case of identifying that the user enters the privacy space, that is, the user enters or is positioned in the first zone 1 (S710), according to one or more embodiments of the disclosure, the processor 130 may identify the first zone 1 and the second zone 2 based on the map information (S720).

Figure 8:
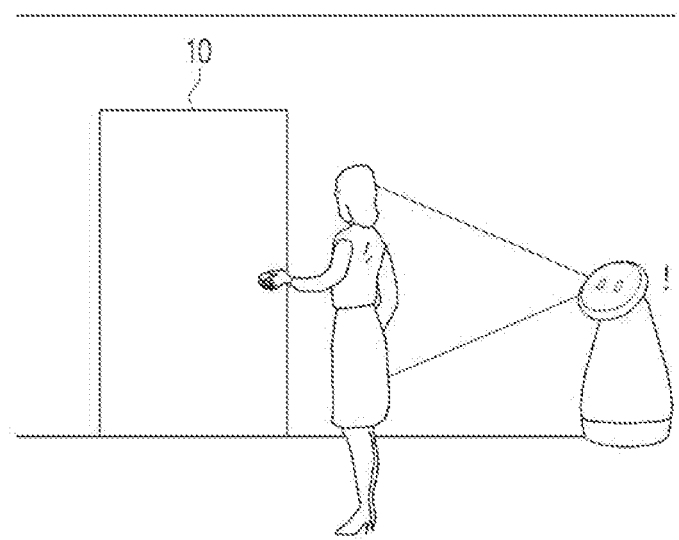
FIG. 8 is a view illustrating an event of activating the first zone and the second zone, according to one or more embodiments of the disclosure.

First, the description describes one or more embodiments in which the processor 130 identifies that the user enters or is positioned in the first zone 1 with reference to FIG. 8.

FIG. 8 is a view illustrating an event of activating the first zone and the second zone according to one or more embodiments of the disclosure.

The processor 130 according to one or more embodiments may identify whether the user enters or is positioned in the first zone 1 based on the detection data of the sensor 110.

As shown in FIG. 8, the processor 130 may identify the first zone 1 and the second zone 2 based on the map information based on the detection data in case of identifying that the user is adjacent to the door frame 10 that classifies and/or distinguishes the first zone 1 from the remaining zones, and enters the first zone 1 through the door frame 10.

In addition, the processor 130 may identify the first zone 1 and the second zone 2 based on the map information in case of identifying the user in the first zone 1 while the robot device 100 is moved along the movement path.

Returning to FIG. 7, the processor 130 may execute a second step of a privacy mode.

The second step of the privacy mode may be a mode in which the processor 130 i) identifies the movement path of the robot device 100 based on the remaining zones except for the first zone 1 among the plurality of zones for the robot device 100 not to be moved to the first zone 1, and ii) adjusts the detection direction of the sensor 110 for the detection zone of the sensor 110 not to include the door frame 10 in case that the robot device 100 is positioned in the second zone 2 while being moved along the movement path (S730).

In the step S730, the processor 130 may provide visual feedback in the privacy mode, the visual feedback indicating that the robot device is not moved to the first zone 1 or the first zone 1 is not detected, that is, the object that classifies and/or distinguishes the first zone 1 from the remaining zones (e.g., door frame 10) is not included in the detection zone.

A detailed description of the step S730 is provided with reference to FIGS. 9 to 12.

Figure 9:
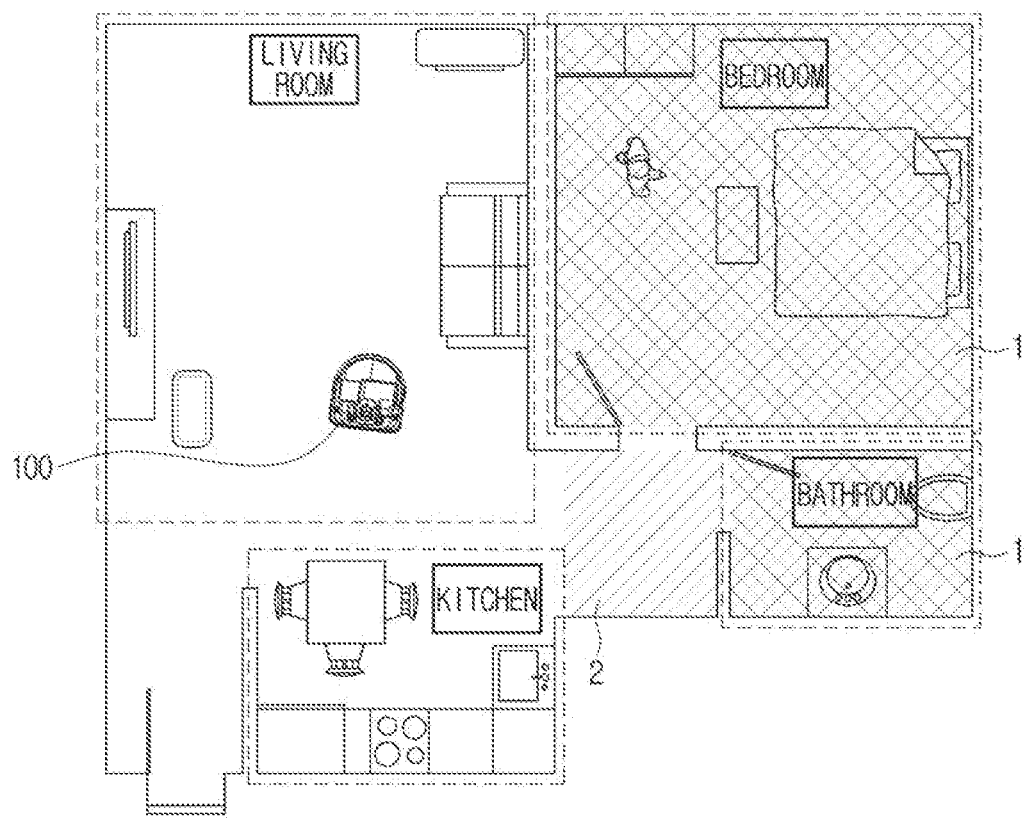
FIG. 9 is a view illustrating an event of activating the first zone and the second zone, according to one or more embodiments of the disclosure.

FIG. 9 is a view illustrating an event of activating the first zone and the second zone according to one or more embodiments of the disclosure.

According to one or more embodiments, the processor 130 may activate the first zone 1 and the second zone 2 based on the map information in case of identifying that the user is positioned in the first zone 1 based on the user position information.

The event of activating the first zone 1 and the second zone 2 may include an event where the user is positioned in the first zone 1.

Therefore, in case that the user is positioned in the first zone 1, the processor 130 may activate the first zone 1 and the second zone 2 to identify the movement path based on the remaining zones except for the first zone 1, and deactivate the sensor 110 or adjust the detection direction of the sensor 110 while the robot device is moved in the second zone 2 along the movement path.

Figure 10:
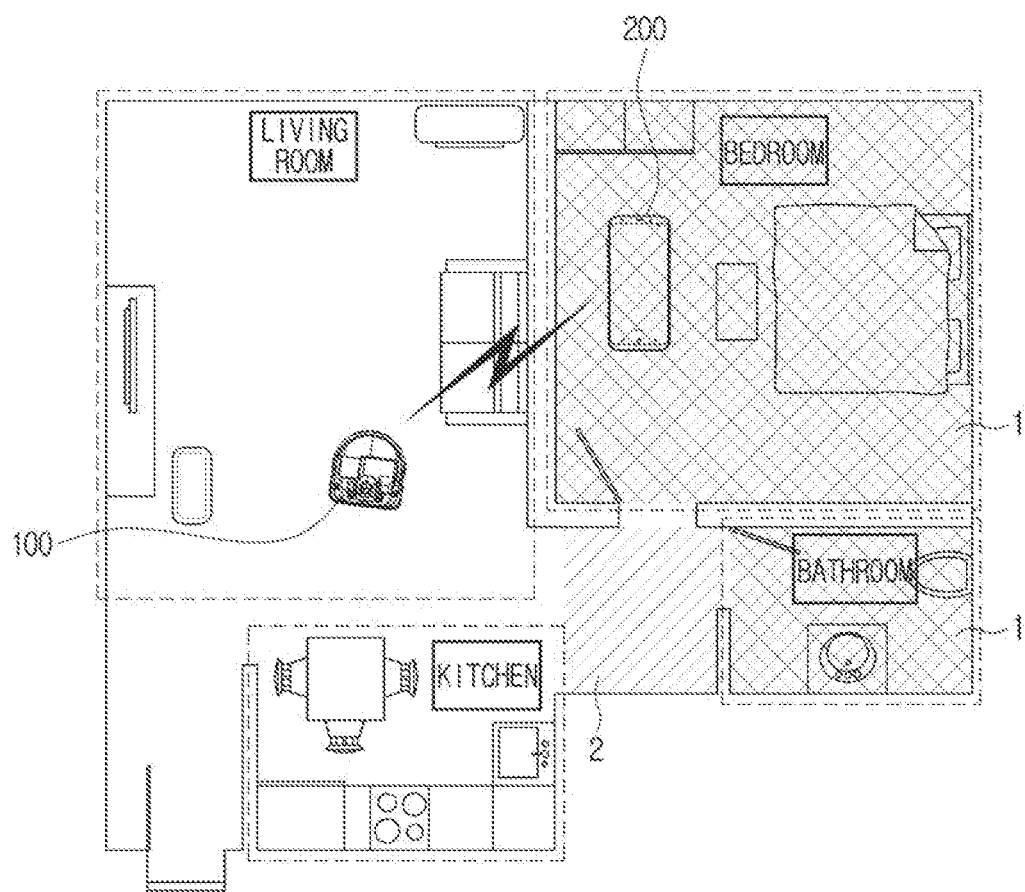
FIG. 10 is a view illustrating an event of activating the first zone and the second zone, according to one or more embodiments of the disclosure.

FIG. 10 is a view illustrating an event of activating the first zone and the second zone according to one or more embodiments of the disclosure.

Referring to FIG. 10, the robot device 100 according to one or more embodiments of the disclosure may further include the communication interface.

For example, the communication interface may receive various data. For example, the communication interface may receive the various data from at least one external device positioned in the house (e.g., user terminal device), an external storage medium (e.g., universal serial bus (USB) memory), an external server (e.g., web hard or streaming server) or the like by using a communication method such as an access point (AP) based wireless fidelity (Wi-Fi, i.e. wireless local area network (LAN)), a Bluetooth, a Zigbee, a wired/wireless local area network (LAN), a wide area network (WAN), Ethernet, an IEEE 1394, a high definition multimedia interface (HDMI), a USB, a mobile high-definition link (MHL), an audio engineering society/European broadcasting union (AES/EBU) communication, an optical communication, or a coaxial communication.

The processor 130 according to one or more embodiments of the disclosure may acquire information on a position of the user terminal device 200 by communicating with the user terminal device through the communication interface.

For example, the processor 130 may identify the position of the user terminal device 200 on the map based on a current position of the robot device 100 on the map and intensity of a signal received from the user terminal device 200.

For example, the processor 130 may communicate with the user terminal device 200 by using ultra-wideband (UWB) technology. The UWB technology is a short-distance wireless communication technology with a radius of about 10 m to 1 km. The processor 130 may communicate with the user terminal device by using the UWB technology, and identify the position of the user terminal device.

In case of identifying that the user terminal device 200 is positioned in the first zone 1 based on the information on the position of the terminal device, the processor 130 according to one or more embodiments may activate the first zone 1 and the second zone 2 based on the map information.

The event of activating the first zone 1 and the second zone 2 may include an event where the user terminal device 200 is positioned in the first zone 1. That is, the processor 130 may identify the information on the position of the user terminal device 200 as the user position information.

The above example assumes, as the event of activating the first zone 1 and the second zone 2, a case where the processor identifies that i) the user enters the first zone 1 or is positioned in the first zone 1 based on the detection data of the sensor 110 or ii) the user terminal device 200 is positioned in the first zone 1 by performing the communication with the user terminal device 200 through the communication interface. However, the disclosure is not limited thereto.

For example, the processor 130 may identify that the user is positioned in the first zone 1 based on state information of the external device in case of receiving the state information from the external device positioned in the first zone 1 through the communication interface.

The external device may include an internet of things (IoT) device. For example, the processor 130 may identify an operation state (e.g., turned on state) of the IoT device based on the state information received from the IoT device, and identify that the user is positioned in a zone (e.g., the first zone 1) where the IoT device is positioned.

For example, the robot device 100 may further include a microphone, and may identify a user position based on intensity of a user voice received through the microphone, a direction in which the user voice is received, or the like For example, the processor 130 may activate the first zone 1 and the second zone 2 in case of identifying that the user is positioned in the first zone 1 based on the user voice received through the microphone.

For example, in case of identifying a situation where the privacy violation may occur, the robot device 100 may identify that the user enters the first zone 1 or is positioned in the first zone 1 by recognizing the user voice received through the microphone (for example, by performing a speech-to-text (STT) function on the user voice). For example, the processor 130 may identify that the user is positioned in the first zone 1 based on the user voice received through the microphone (for example, a recognition result of the user voice may be "I need to take a shower," "I need to change clothes," "I need to sleep now," or the like). In this case, the processor 130 may activate the first zone 1 and the second zone 2 based on the map information.

For example, the processor 130 may include schedule information. Here, the schedule information may include a user behavior, a user position, or the like, for each time slot.

For example, the processor 130 may identify the movement path for the robot device not to be moved to the first zone 1 (e.g., bedroom) from 00:30 AM to 07:00 AM in case of identifying that the user sleeps (or the user is positioned in the bedroom) from 00:30 AM to 07:00 AM based on the schedule information.

For example, the processor 130 may identify the movement path for the robot device not to be moved to the first zone 1 (e.g., bathroom) from 07:00 AM to 08:00 AM in case of identifying that the user takes a shower (or the user is positioned in the bathroom) from 07:00 AM to 08:00 AM based on the schedule information.

As described above, according to various embodiments, in case of identifying that the user is positioned in the first zone 1, the processor 130 may activate the first zone 1 and the second zone 2 to identify the movement path based on the remaining zones except for the first zone 1, and deactivate the sensor 110 or adjust the detection direction of the sensor 110 while the robot device 100 is moved in the second zone 2 along the movement path.

Returning to FIG. 7, in case that the robot device 100 is positioned in the second zone 2 while being moved along the movement path in the step S730, the processor 130 may adjust the detection direction of the sensor 110 for the detection zone of the sensor 110 not to include the door frame 10.

Figure 11:
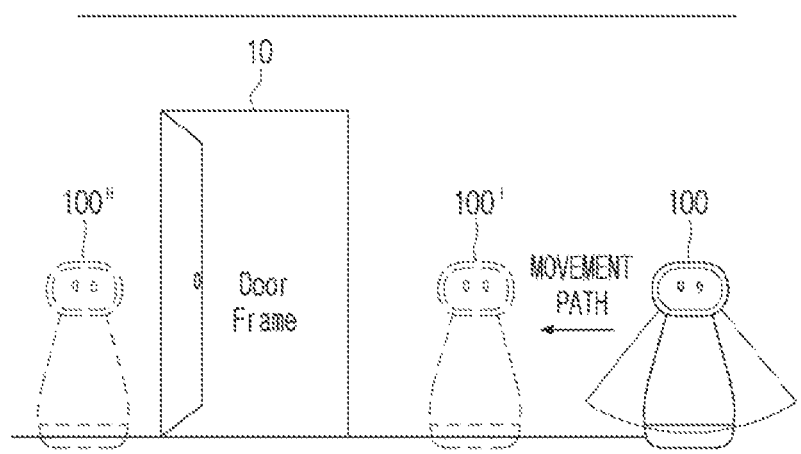
FIG. 11 is a view illustrating movement of the robot device in the second zone, according to one or more embodiments of the disclosure.

FIG. 11 is a view illustrating the movement of the robot device in the second zone according to one or more embodiments of the disclosure.

Referring to FIG. 11, the processor 130 may adjust the detection direction of the sensor 110 (e.g., pose of the LiDAR sensor or field of view (FOV) of the camera) not to match the movement direction of the robot device 100 while the robot device 100 is moved in the second zone 2 (for example, a path connected to the first zone 1 or the zone within the N meter (m) in the radius direction from the door frame 10 that classifies and/or distinguishes the first zone 1 from the remaining zones) adjacent to the first zone 1.

For example, the processor 130 may adjust the detection direction of the sensor 110 for the detection zone of the sensor 110 not to include the door frame 10.

Figure 12:
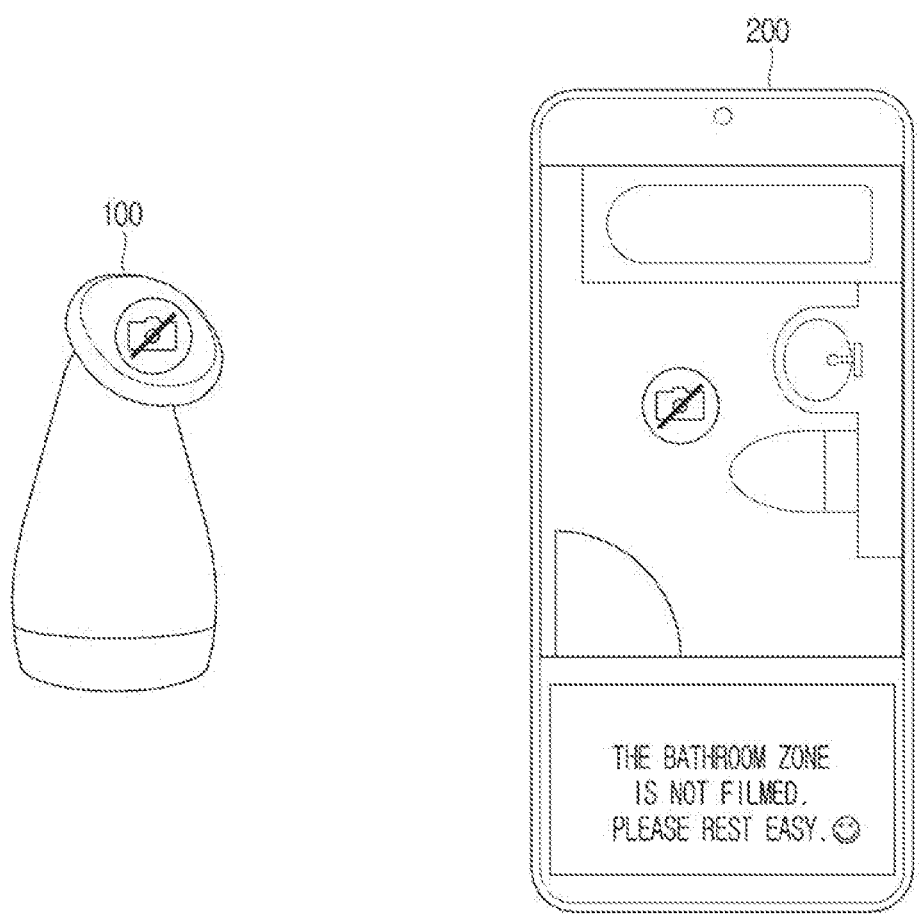
FIG. 12 is a view illustrating the robot device and a terminal device, providing visual feedback, according to one or more embodiments of the disclosure.

FIG. 12 is a view illustrating the robot device and the terminal device, providing visual feedback, according to one or more embodiments of the disclosure.

In the step S730 of FIG. 7, the processor 130 may provide the visual feedback in the privacy mode, the visual feedback indicating that the robot device is not moved to the first zone 1 or the first zone 1 is not detected, that is, the object that classifies and/or distinguishes the first zone 1 from the remaining zones (e.g., door frame 10) is not included in the detection zone.

Referring to FIG. 12, the robot device 100 may further include a display.

For example, the display may be implemented in various types of displays such as a liquid crystal display (LCD), an organic light emitting diode (OLED) display, a light emitting diode (LED) display, a micro light emitting diode (micro LED) display, a mini LED display, a plasma display panel (PDP) display, a quantum dot (QD) display, a quantum dot light-emitting diode (QLED) display. The display may also include a driving circuit, a backlight unit, and the like, which may be implemented in a form such as an a-si thin film transistor (TFT), a low temperature poly silicon (LTPS) TFT, or an organic TFT (OTFT). The display may be implemented as a touch screen combined with a touch sensor, a flexible display, a rollable display, a three-dimensional (3D) display, a display in which a plurality of display modules are physically connected with each other, or the like.

According to one or more embodiments, the processor 130 may control the display to provide visual feedback indicating the deactivation of the sensor 110 or the visual feedback indicating that the first zone 1 is not included in the detection zone.

In addition, the processor 130 may control the communication interface to transmit a control signal to the user terminal device 200. Here, the control signal may include a signal for controlling the user terminal device 200 to provide the visual feedback indicating the deactivation of the sensor 110 of the robot device 100 or the visual feedback indicating that detection zone of the sensor 110 does not include the first zone 1.

As shown in FIG. 12, the user terminal device 200 may display the visual feedback indicating that the robot device 100 is not moved to the first zone 1 or the visual feedback indicating that the first zone 1 or the second zone 2 is not included in the detection zone, based on the control signal.

Returning to FIG. 7, in case that the robot device 100 needs to be moved to the first zone 1 (S740-Y), the processor 130 may execute the first step of the privacy mode (S750).

Here, the first step of the privacy mode may be a mode in which the processor 130 i) identifies the movement path of the robot device 100 based on the plurality of zones for the robot device 100 to be moved to the first zone 1, and ii) deactivates the sensor 110 in case that the robot device 100 is positioned in the first zone 1 or the second zone 2 while being moved along the movement path (S750).

In the step S750, the processor 130 may provide the visual feedback indicating the deactivation of the sensor 110 in the privacy mode while the robot device 100 is moved through the first zone 1 or the second zone 2.

For example, the processor 130 may assume a case where the robot device 100 needs to be moved in the first zone 1 to perform a function. In this case, the processor 130 may execute the first step of the privacy mode to identify the movement path of the robot device 100 based on the plurality of zones for the robot device 100 to be moved to the first zone 1, and deactivate the sensor 110 in case that the robot device 100 is positioned in the first zone 1 or the second zone 2 while being moved along the movement path.

For example, the processor 130 may move the robot device 100 to the first zone 1 in case of identifying a call from the user positioned in the first zone 1 based on the user voice received through the microphone (e.g., in case that a recognition result of the user voice is "Come to me right away"). However, the processor 130 may deactivate the sensor 110 in case that the robot device 100 is positioned in the first zone 1 or the second zone 2.

For example, the processor 130 may move the robot device 100 to the first zone 1 in case of identifying an emergency situation of the user positioned in the first zone 1 based on the state information received through the user terminal device. Here, the user terminal device may be a wearable device, and the state information of the user terminal device may include detection of a user heart rate, a user fall, or the like.

Returning to FIG. 7, in case that a predetermined event of releasing (both the first and second steps of) the privacy mode occurs (S760-Y), the processor 130 may release the privacy mode (S770).

Here, the predetermined event of releasing the privacy mode may include an event of deactivating the first zone 1 and the second zone 2.

Figure 13:
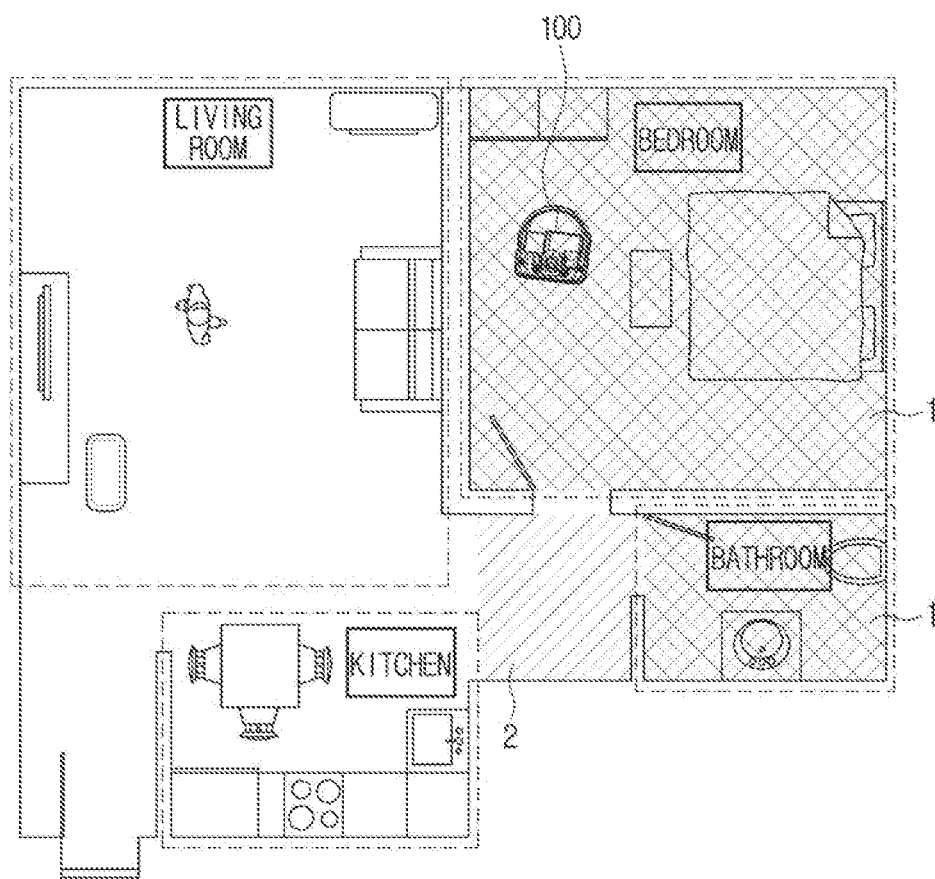
FIG. 13 is a view illustrating an event of deactivating the first zone and the second zone, according to one or more embodiments of the disclosure.

FIG. 13 is a view illustrating the event of deactivating the first zone and the second zone according to one or more embodiments of the disclosure.

The processor 130 according to one or more embodiments of the disclosure may re-identify the movement path based on the plurality of zones in case of identifying the predetermined event of releasing the privacy mode. That is, the re-identified movement path may include the first zone 1 and the second zone 2.

Here, the predetermined event may include an event in which the user position is changed from the first zone 1 to a third zone. For example, the processor 130 may release the privacy mode based on the detection data in case of identifying that the user comes out of the first zone 1 or is positioned in the third zone other than the first zone 1.

Here, the third zone may include the remaining zones except for the first zone 1 among the plurality of zones included in the map. That is, the processor 130 may re-identify the movement path for the robot device 100 to be moved to the first zone 1 (that is, release the privacy mode) in case of identifying that the user is positioned in the remaining zones other than in the restricted movement zone.

The predetermined event according to one or more embodiments may include an event of receiving a user call signal from the user terminal device 200.

The processor 130 according to one or more embodiments may move the robot device 100 to the first zone 1 (that is, release the privacy mode) in case of receiving the call signal, that is, the command to move the robot device 100 to the first zone 1 from the user terminal device 200.

In addition, the processor 130 may identify the movement path from 09:30 AM to 18:00 PM based on the plurality of zones included in the map in case of identifying that the user goes out from 09:00 AM to 18:00 PM based on the schedule information.

For example, the processor 130 may identify the movement path for the robot device not to be moved to the first zone 1 (e.g., bathroom) from 07:00 AM to 08:00 AM in case of identifying that the user takes a shower (or the user is positioned in the bathroom) from 07:00 AM to 08:00 AM based on the schedule information.

Figure 14:
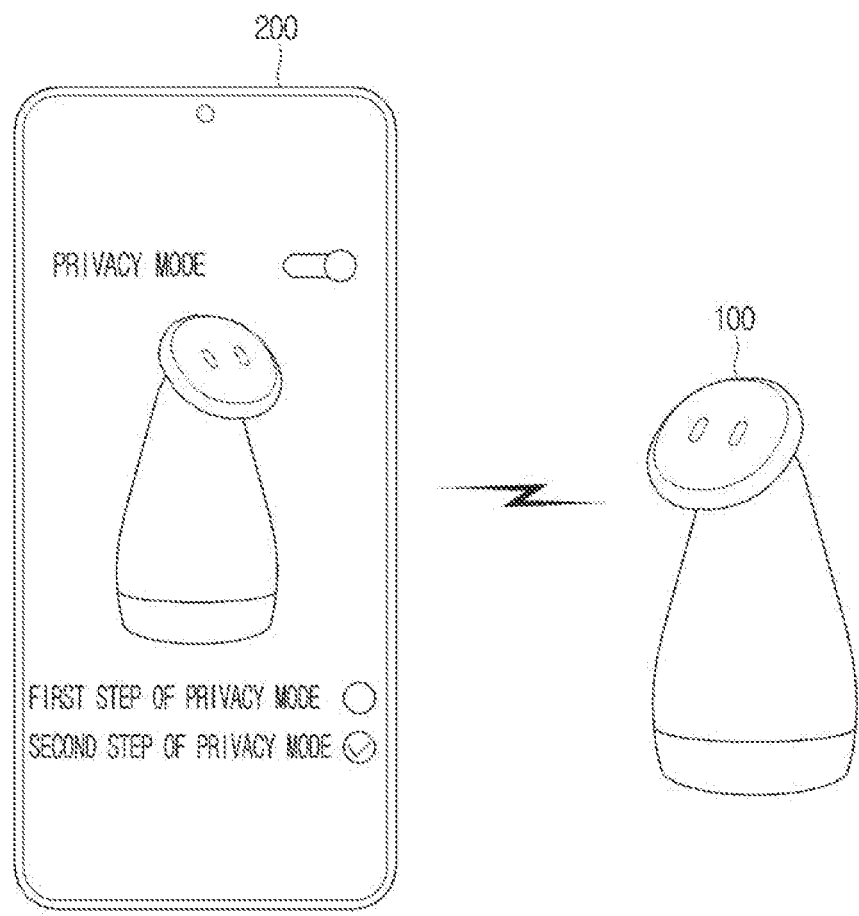
FIG. 14 is a view illustrating a user interface (UI) for activating or deactivating the first zone and the second zone, according to one or more embodiments of the disclosure.

FIG. 14 is a view illustrating a user interface (UI) for activating or deactivating the first zone and the second zone according to one or more embodiments of the disclosure.

Referring to FIG. 14, the user terminal device 200 may provide a UI for activating or deactivating the privacy mode.

In addition, the user terminal device 200 may provide a UI for selecting whether to activate the first step or second step of the privacy mode while activating the privacy mode.

Here, as described in the step S750 of FIG. 7, the first step of the privacy mode may be a mode in which although the robot device 100 may be moved to the first zone 1, the processor 130 deactivates the sensor 110 while the robot device is moved to the first zone 1 or the second zone 2 (or while the robot device is positioned in the first zone 1 or the second zone 2).

In addition, as described in the step S730 of FIG. 7, the second step of the privacy mode may be a mode in which the robot device 100 is not allowed to be moved to the first zone 1, and the processor 130 deactivates the sensor 110 or adjusts the detection zone of the sensor 110 while the robot device is moved in the second zone 2 (or, while the robot device is positioned in the second zone 2).

For example, the processor 130 may control the robot device 100 based on the control signal (e.g., signal for activating or deactivating the privacy mode selected by the user, or step (e.g., first step or second step) of the privacy mode) received from the user terminal device 200.

Figure 15:
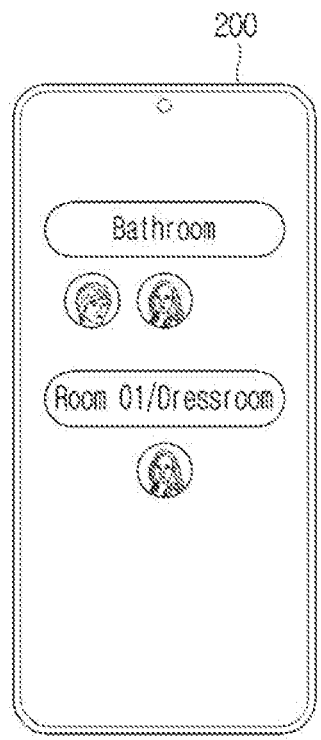
FIG. 15 is a view illustrating the first zone corresponding to each of a plurality of users according to one or more embodiments of the disclosure.
Figure 15:
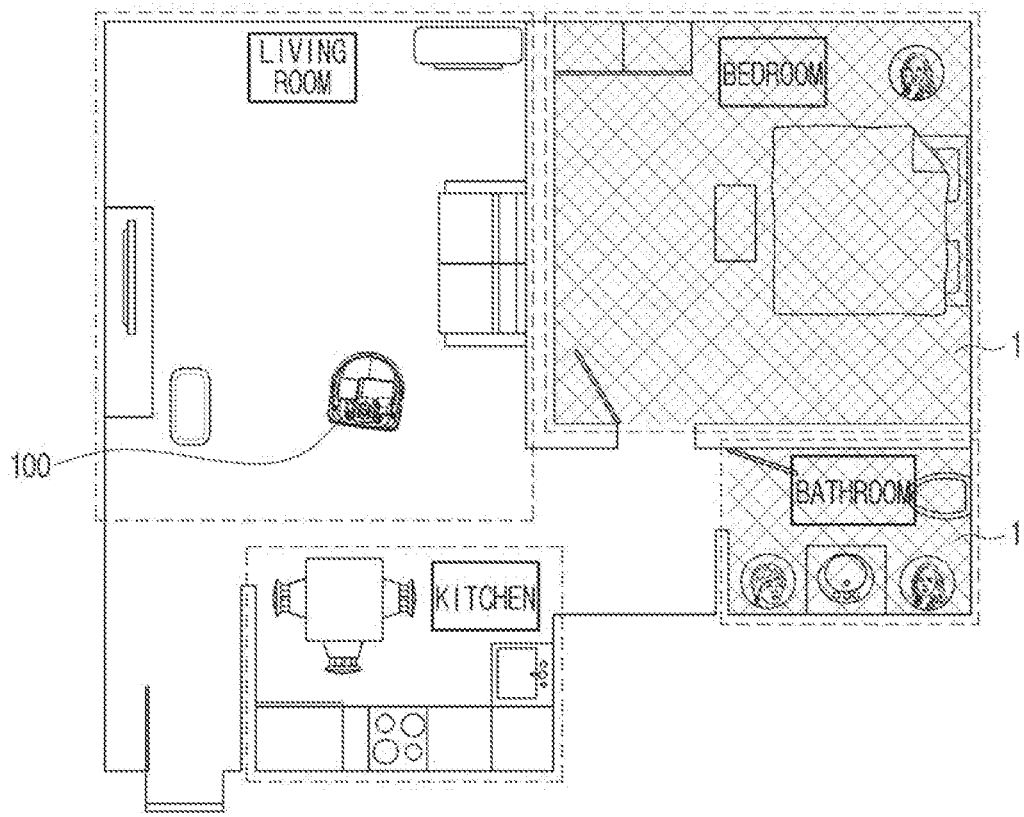

FIG. 15 is a view illustrating the first zone corresponding to each of a plurality of users according to one or more embodiments of the disclosure.

Referring to FIG. 15, the memory 120 may include map information corresponding to each of the plurality of users.

For example, the first zone 1 and the second zone 2, included in first map information corresponding to a first user, and the first zone 1 and the second zone 2, included in second map information corresponding to a second user, may be different from each other.

According to one or more embodiments, the processor 130 may identify the user based on the detection data, and activate or deactivate the first zone 1 and the second zone 2 based on the map information corresponding to the identified user.

For example, in case of identifying the first user based on the detection data, the processor 130 may identify whether the first user is positioned in the first zone 1 based on the first zone 1 included in the first map information corresponding to the first user.

For example, a zone where the first user is identified as being positioned based on the detection data by the processor 130 may not be the restricted movement zone based on the first map information corresponding to the first user, whereas this zone may be the restricted movement zone based on the second map information corresponding to the second user. In this case, the processor 130 may identify the movement path based on the plurality of zones included in the map. That is, the robot device 100 may be moved in the zone where the first user is identified as being positioned.

For example, a zone where the second user is identified as being positioned based on the detection data by the processor 130 may not be the restricted movement zone based on the first map information corresponding to the first user, whereas this zone may be the restricted movement zone based on the second map information corresponding to the second user. In this case, the processor 130 may identify the movement path based on the remaining zones except for the first zone 1 among the plurality of zones included in the map. That is, the robot device 100 is unable to be moved in the zone where the second user is identified as being positioned.

Figure 16:
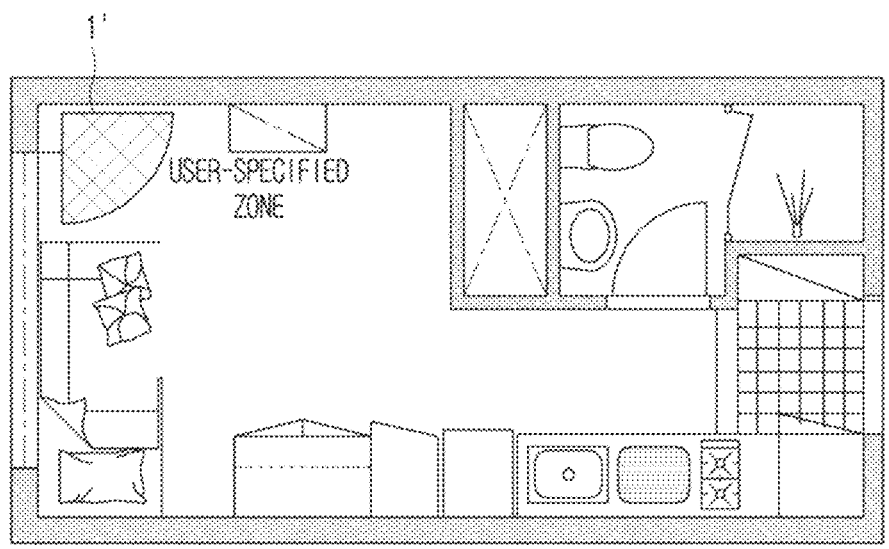
FIG. 16 is a view illustrating the first zone according to one or more embodiments of the disclosure.

FIG. 16 is a view illustrating the first zone according to one or more embodiments of the disclosure.

FIG. 16 is a view assuming a case where the predetermined space where the robot device 100 is positioned includes one zone.

According to one or more embodiments, in case of identifying that the user is positioned in the predetermined space based on the detection data, the processor 130 may position the robot device 100 in a restricted zone 1' in the predetermined space.

For example, the predetermined space where the robot device 100 is positioned may include one zone (e.g., studio type apartment). In this case, the processor 130 is unable to move the robot device in the remaining zones except for the zone where the user is identified as being positioned, and thus position the robot device 100 in the restricted zone 1' within the predetermined space.

In addition, the processor 130 may control the detection direction of the sensor 110 for a predetermined object not to be included in the detection zone while the robot device 100 is moved along the movement path.

For example, the processor 130 may set the sensor 110 not to detect a document that requires high security, a monitor object whose screen may be detected, or a desk object. The sensor 110 may not detect the predetermined object (e.g., monitor object, desk object, or a paper object) under the control of the processor 130.

Figure 17:
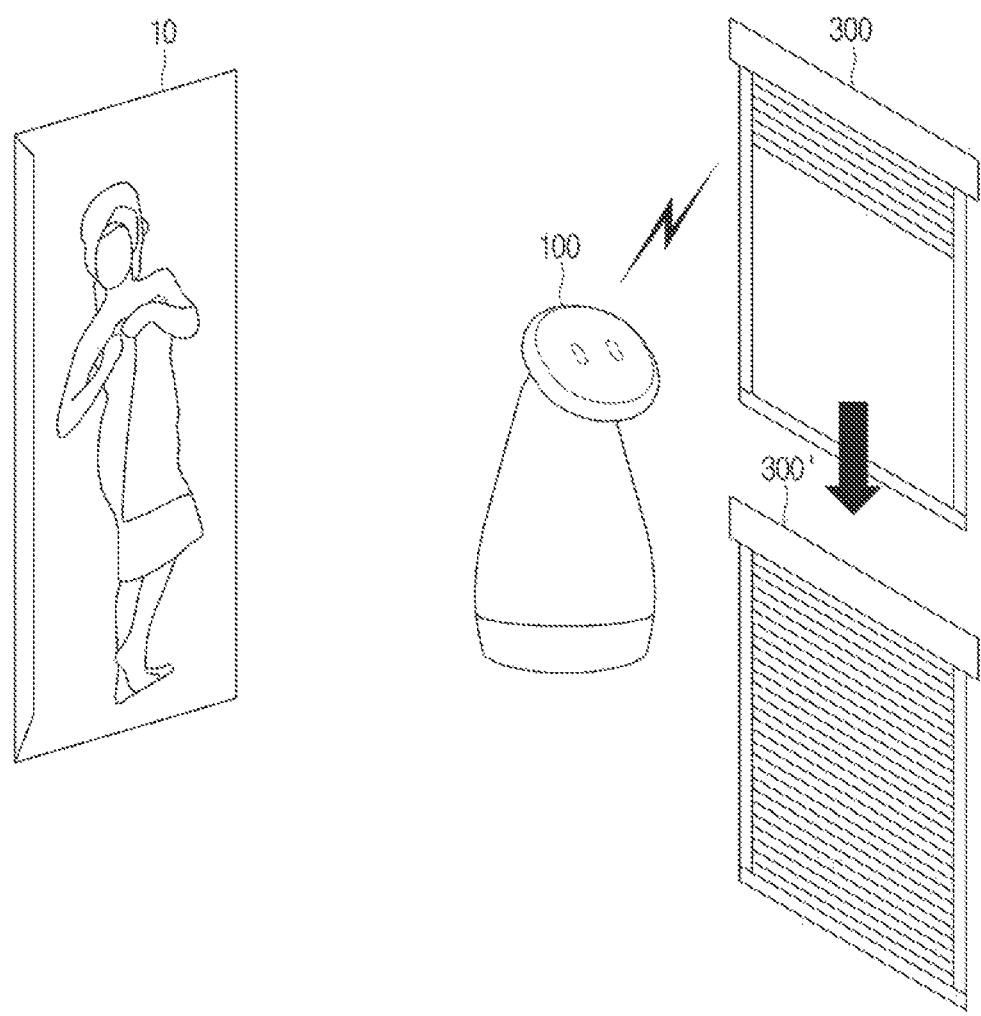
FIG. 17 is a view illustrating the robot device controlling an external device according to one or more embodiments of the disclosure.

FIG. 17 is a view illustrating the robot device controlling an external device according to one or more embodiments of the disclosure.

Referring to FIG. 17, in case of identifying that the user positioned in the first zone 1, the processor 130 may identify an external device 300 positioned in the first zone 1.

The processor 130 may control the communication interface to transmit a control signal corresponding to the external device 300 to the external device 300.

Here, the external device 300 may include the internet of things (IoT) device. For example, the IoT device may include a window blind, indoor lighting, an electric curtain, or the like.

For example, in case of identifying that the user is positioned in the first zone 1, the processor 130 may transmit, to at least one IoT device, the signal for controlling at least one IoT device (e.g., blind, lighting, or electric curtain) positioned in the first zone 1.

For example, the first zone 1 where the user is identified as being currently positioned is a zone where the privacy violation may occur. Therefore, the processor 130 may transmit the control signal to the window blind, the electric curtain, or the like, positioned in the first zone 1 for the first zone 1 not to be exposed to the outside. In addition, the processor 130 may transmit the control signal for turning off the indoor lighting positioned in the first zone 1 for the first zone 1 not to be exposed to the outside.

Figure 18:
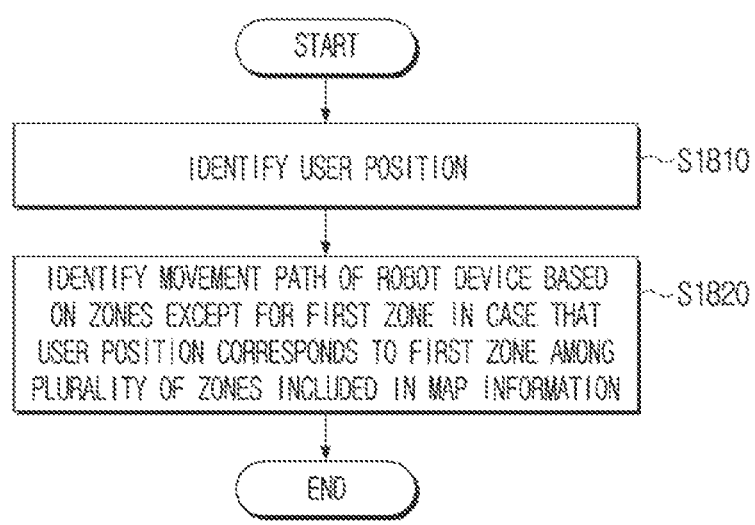
FIG. 18 is a view illustrating a control method of a robot device according to one or more embodiments of the disclosure.

FIG. 18 is a view illustrating a control method of a robot device according to one or more embodiments of the disclosure.

The control method of the robot device which includes map information corresponding to a predetermined space and including a plurality of zones according to one or more embodiments of the disclosure may first include identifying whether a user is positioned in a first zone among the plurality of zones based on identified user position information and the map information in case that the position information is identified (S1810).

The method may include identifying a movement path of the robot device based on remaining zones except for the first zone among the plurality of zones in case that the user is identified as being positioned in the first zone among the plurality of zones (S1820).

The method may include identifying a second zone adjacent to the first zone among the plurality of zones based on the map information (S1830).

The method may include controlling an operation of a sensor in case that the robot device is positioned in the second zone while the robot device is moved along the identified movement path (S1840).

Here, the map information may include information on the first zone indicating a restricted movement zone of the robot device among the plurality of zones, and information on the second zone indicating a restricted detection zone of the sensor.

The step S1820 of identifying the movement path according to one or more embodiments may include identifying the movement path for the movement path not to include the first zone among the plurality of zones in case that the user is identified as being positioned in the first zone; and the step S1820 of controlling the operation of the sensor may include deactivating the sensor based on the information on the second zone while the robot device is moved in the second zone along the movement path. For example, the control method may further include: providing visual feedback indicating the deactivation of the sensor in case that the sensor is deactivated; and transmitting a control signal for controlling a user terminal device to provide the visual feedback to the user terminal device.

For example, the sensor may include a camera, the step S1840 of controlling the operation of the sensor may include adjusting a detection direction of the camera for a detection zone of the camera not to include an object that classifies and/or distinguishes the first zone from the remaining zones while the robot device is moved in the second zone along the movement path, and the object may be a door frame.

For example, the step S1810 of identifying whether the user is positioned in the first zone may include: receiving information on a position of the user terminal device by communicating with the terminal device; and identifying the information on the position of the terminal device as the user position information.

For example, the step S1810 of identifying whether the user is positioned in the first zone may include identifying a user position based on state information of an external device in case that the state information is received from the external device positioned in the first zone.

The control method according to one or more embodiments may further include re-identifying the movement path based on the plurality of zones in case that a predetermined event is identified.

The predetermined event may be an event in which the user position is changed from the first zone to a third zone among the plurality of zones, and the third zone may be the remaining zones except for the first zone among the plurality of zones.

The predetermined event according to one or more embodiments may be an event of receiving a user call signal, and the re-identifying of the movement path may include re-identifying the movement path for the robot device to be moved to the zone where the user is positioned among the plurality of zones based on the user position information and the map information in case that the call signal is identified.

The control method according to one or more embodiments may further include: identifying an external device positioned in the first zone in case that the user is identified as being positioned in the first zone; acquiring a control signal corresponding to the identified external device; and transmitting the acquired control signal to the external device.

However, the various embodiments of the disclosure may be applied to all movable electronic devices as well as the robot device.

The various embodiments described above may be implemented in a computer or a computer-readable recording medium using software, hardware, or a combination of software and hardware. In some cases, embodiments described in the specification may be implemented by the processor itself. According to a software implementation, embodiments such as the procedures and functions described in the specification may be implemented by separate software modules. Each of the software modules may perform one or more functions and operations described in the specification.

Computer instructions for performing processing operations of the robot device according to the various embodiments of the disclosure described above may be stored in a non-transitory computer-readable medium. The computer instructions stored in the non-transitory computer-readable medium may allow a specific device to perform the processing operations of the robot device 100 according to the various embodiments described above in case that the computer instructions are executed by a processor of the specific device.

The non-transitory computer-readable medium is not a medium that stores data therein for a while, such as a register, a cache, or a memory, and indicates a medium that semi-permanently stores data therein and is readable by the machine. A specific example of the non-transitory computer-readable medium may include a compact disk (CD), a digital versatile disk (DVD), a hard disk, a Blu-ray disk, a universal serial bus (USB), a memory card, a read-only memory (ROM), or the like.

Although embodiments of the disclosure have been shown and described hereinabove, the disclosure is not limited to the above-mentioned specific embodiments, and may be variously modified by those skilled in the art to which the disclosure pertains without departing from the scope and spirit of the disclosure as disclosed in the accompanying claims. These modifications should also be understood to fall within the scope and spirit of the disclosure.

What is claimed is:

1. A robot device comprising:
   a sensor comprising a camera;
   a memory configured to store map information corresponding to a predetermined space, the map information including a plurality of zones; and
   at least one processor configured to:
      identify a position of a user;
      identify whether the user is positioned in a first zone among the plurality of zones, based on the identified position of the user and the map information, and
      based on identifying that the user is positioned in the first zone, identify a movement path of the robot device based on remaining zones, except for the first zone, among the plurality of zones,
      based on identifying that the user is positioned in the first zone, identify a second zone adjacent to the first zone from among the plurality of zones, based on the map information,
      based on the robot device being positioned in the second zone while the robot device is moved along the identified movement path, control an operation of the sensor, and adjust a detection direction of the camera for a detection zone of the camera to not include an object that distinguishes the first zone from the remaining zones while the robot device is moved along the identified movement path.

2. The robot device of claim 1, wherein the map information includes information about the first zone indicating a restricted movement zone of the robot device, and information about the second zone indicating a restricted detection zone of the sensor, and
wherein the at least one processor is further configured to:
based on identifying that the user is positioned in the first zone, identify the movement path to not include the first zone, and
deactivate the sensor based on the information about the second zone while the robot device is moved in the second zone along the movement path.

3. The robot device of claim 2, further comprising:
a communication interface including a circuit; and
a display,
wherein the at least one processor is further configured to:
based on the sensor being deactivated, control the display to provide visual feedback indicating the sensor is deactivated, and
transmit a control signal to a user terminal device to provide the visual feedback to the user terminal device through the communication interface.

4. The robot device of claim 1,
wherein the at least one processor is further configured to:
adjust the detection direction of the camera for the detection zone of the camera to not include the object that distinguishes the first zone from the remaining zones while the robot device is moved in the second zone along the movement path, and wherein the object is a door frame.

5. The robot device of claim 1, further comprising a communication interface including a circuit,
wherein the at least one processor is further configured to:
receive information about a position of a user terminal device by communicating with the user terminal device through the communication interface, and
identify the information about the position of the user terminal device as the position of the user.

6. The robot device of claim 1, further comprising a communication interface including a circuit,
wherein the at least one processor is further configured to, based on receiving state information from an external device positioned in the first zone, identify the position of the user based on the state information of the external device.

7. The robot device of claim 1, wherein the at least one processor is further configured to, based on identifying a predetermined event, re-identify the movement path based on the plurality of zones.

8. The robot device of claim 7, wherein the predetermined event is an event in which the position of the user is changed from the first zone to a third zone among the plurality of zones, and
wherein the third zone is the remaining zones among the plurality of zones except for the first zone.

9. The robot device of claim 7, further comprising a communication interface including a circuit,
wherein the predetermined event is an event of receiving a user call signal through the communication interface, and
wherein the at least one processor is further configured to, based on identifying the user call signal, re-identify the movement path for the robot device to be moved to a zone where the user is positioned among the plurality of zones based on the position of the user and the map information.

10. The robot device of claim 1, further comprising a communication interface including a circuit,
wherein the at least one processor is further configured to:
based on identifying that the user is positioned in the first zone, identify an external device positioned in the first zone,
acquire a control signal corresponding to the identified external device, and
transmit the acquired control signal to the external device through the communication interface.

11. A control method of a robot device, provided with a sensor comprising a camera, that includes map information corresponding to a predetermined space, the map information including a plurality of zones, the control method comprising:
identifying a position of a user;
identifying whether the user is positioned in a first zone among the plurality of zones based on the identified position of the user and the map information;
based on identifying that the user is positioned in the first zone, identifying a movement path of the robot device based on remaining zones, except for the first zone, among the plurality of zones;
based on identifying that the user is positioned in the first zone, identifying a second zone adjacent to the first zone from among the plurality of zones, based on the map information;
based on the robot device being positioned in the second zone while the robot device is moved along the identified movement path, controlling an operation of the sensor, and
adjusting a detection direction of the camera for a detection zone of the camera to not include an object that distinguishes the first zone from the remaining zones while the robot device is moved along the identified movement path.

12. The control method of claim 11, wherein the map information includes information about the first zone indicating a restricted movement zone of the robot device, and information about the second zone indicating a restricted detection zone of the sensor,
wherein the identifying of the movement path includes, based on identifying that the user is positioned in the first zone, identifying the movement path to not include the first zone, and
wherein the controlling of the operation of the sensor includes deactivating the sensor based on the information about the second zone while the robot device is moved in the second zone along the movement path.

13. The control method of claim 12, further comprising:
based on the sensor being deactivated, providing visual feedback indicating the deactivation of the sensor; and
transmitting a control signal to a user terminal device to provide the visual feedback to the user terminal device.

14. The control method of claim 11,
wherein the controlling of the operation of the sensor comprises adjusting the detection direction of the camera for the detection zone of the camera to not include the object that distinguishes the first zone from the remaining zones while the robot device is moved in the second zone along the movement path, and
wherein the object is a door frame.

15. The control method of claim 11, wherein the identifying of whether the user is positioned in the first zone comprises:
receiving information about a position of a user terminal device by communicating with the user terminal device; and
identifying the information about the position of the user terminal device as the position of the user.

16. An electronic device, provided with a sensor comprising a camera, the electronic device comprising:
a memory configured to store instructions;
at least one processor configured to execute the instructions to:
identify a position of a user;
identify whether the user is positioned in a first zone among a plurality of zones, based on the identified position of the user and map information, the map information including the plurality of zones, and
based on identifying that the user is positioned in the first zone, identify a movement path of the electronic device based on remaining zones, except for the first zone, among the plurality of zones,
based on identifying that the user is positioned in the first zone, identify a second zone adjacent to the first zone from among the plurality of zones, based on the map information,
based on the electronic device being positioned in the second zone while the electronic device is moved along the identified movement path, control an operation of the sensor, and
adjust a detection direction of the camera for a detection zone of the camera to not include an object that distinguishes the first zone from the remaining zones while the electronic device is moved along the movement path.

17. The electronic device of claim 16, wherein the map information includes information about the first zone indicating a restricted movement zone of the electronic device, and information about the second zone indicating a restricted detection zone of the sensor, and
wherein the at least one processor is further configured to:
based on identifying that the user is positioned in the first zone, identify the movement path to not include the first zone, and
deactivate the sensor based on the information about the second zone while the electronic device is moved in the second zone along the movement path.

18. The electronic device of claim 17, further comprising:
a communication interface including a circuit; and
a display,
wherein the at least one processor is further configured to:
based on the sensor being deactivated, control the display to provide visual feedback indicating the sensor is deactivated, and
transmit a control signal to a user terminal device to provide the visual feedback to the user terminal device through the communication interface.

19. The electronic device of claim 16,
wherein the at least one processor is further configured to:
adjust the detection direction of the camera for the detection zone of the camera to not include the object that distinguishes the first zone from the remaining zones while the electronic device is moved in the second zone along the movement path.

20. The electronic device of claim 16, further comprising a communication interface including a circuit,
wherein the at least one processor is further configured to:
receive information about a position of a user terminal device by communicating with the user terminal device through the communication interface, and
identify the information about the position of the user terminal device as the position of the user.

* * * * *